(12) United States Patent
Primus et al.

(10) Patent No.: US 10,152,118 B2
(45) Date of Patent: Dec. 11, 2018

(54) EMOTION-BASED EXPERIENCE FREEDBACK

(71) Applicant: The Virtual Reality Company, Los Angeles, CA (US)

(72) Inventors: Guy Primus, Los Angeles, CA (US); Kevin Primus, Durham, NC (US)

(73) Assignee: The Virtual Reality Company, Los Angeles, CA (US)

( * ) Notice: Subject to any disclaimer, the term of this patent is extended or adjusted under 35 U.S.C. 154(b) by 0 days.

(21) Appl. No.: 15/497,643

(22) Filed: Apr. 26, 2017

(65) Prior Publication Data

US 2018/0314321 A1    Nov. 1, 2018

(51) Int. Cl.
*G06F 3/16* (2006.01)
*G06F 3/01* (2006.01)

(52) U.S. Cl.
CPC .............. *G06F 3/011* (2013.01); *G06F 3/012* (2013.01); *G06F 3/013* (2013.01); *G06F 3/016* (2013.01); *G06F 3/16* (2013.01)

(58) Field of Classification Search
CPC .......... G06F 3/011; G06F 3/012; G06F 3/013; G06F 3/016
See application file for complete search history.

(56) References Cited

U.S. PATENT DOCUMENTS 9,612,654 B2 *  4/2017  Brokken ............... G06F 3/011
9,741,258 B1 *  8/2017  Chetlur ................ G09B 5/12
2007/0149282 A1 *  6/2007  Lu ......................... A63F 13/06
                                                     463/36
2011/0102320 A1 *  5/2011  Hauke ................... G06F 3/011
                                                     345/158
2011/0207100 A1 *  8/2011  Brokken ............... G06F 3/011
                                                     434/236
2014/0085414 A1 *  3/2014  Zhou ..................... A61H 23/02
                                                     348/43
2014/0112556 A1 *  4/2014  Kalinli-Akbacak .... G10L 25/63
                                                     382/128
2014/0324749 A1 * 10/2014  Peters ................... G09B 7/04
                                                     706/46

OTHER PUBLICATIONS

"International Application Serial No. PCT US2018 029433, Written Opinion dated May 25, 2018", 6 pgs.
"International Application Serial No. PCT US2018 029433, International Search Report dated May 25, 2018", 3 pgs.

* cited by examiner

*Primary Examiner* — Michael Pervan
(74) *Attorney, Agent, or Firm* — Schwegman Lundberg & Woessner, P.A.

(57) ABSTRACT

Various embodiments described herein provide for systems and methods for delivering experience elements of a digital experience to a participant based on an emotional response, from the participant, to the digital experience. The systems and methods dynamically score a digital experience, such as a virtual reality experience (VRE), for a participant based on the participant's past or present emotional response to the digital experience. The dynamic scoring of the digital experience can, for example, determine a narrative orientation of a narrative digital experience, or can determine experience elements (e.g., cinematic elements) expressed or applied to the digital experience.

19 Claims, 7 Drawing Sheets

EMOTION-BASED EXPERIENCE FREEDBACK

TECHNICAL FIELD

The present disclosure relates generally to digital experiences. More particularly, various embodiments described herein provide for systems and methods for delivering experience elements of a digital experience to a participant based on an emotional response from the participant to the digital experience.

BACKGROUND

Digital experiences have become a prevalent method of informing and entertaining society. These experiences come in variety of forms, such as movies, gaming, augmented reality, and virtual reality, and can be experienced by participants through a variety of apparatuses, including personal computers, smartphones, movie theaters, gaming devices, and virtual reality equipment (e.g., virtual reality headset). Certain digital experiences, such as video games and virtual reality experiences, permit participants to interact with the digital experiences in such a way that the interactions determine what the participants experience.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings.

DETAILED DESCRIPTION

Figure 1:
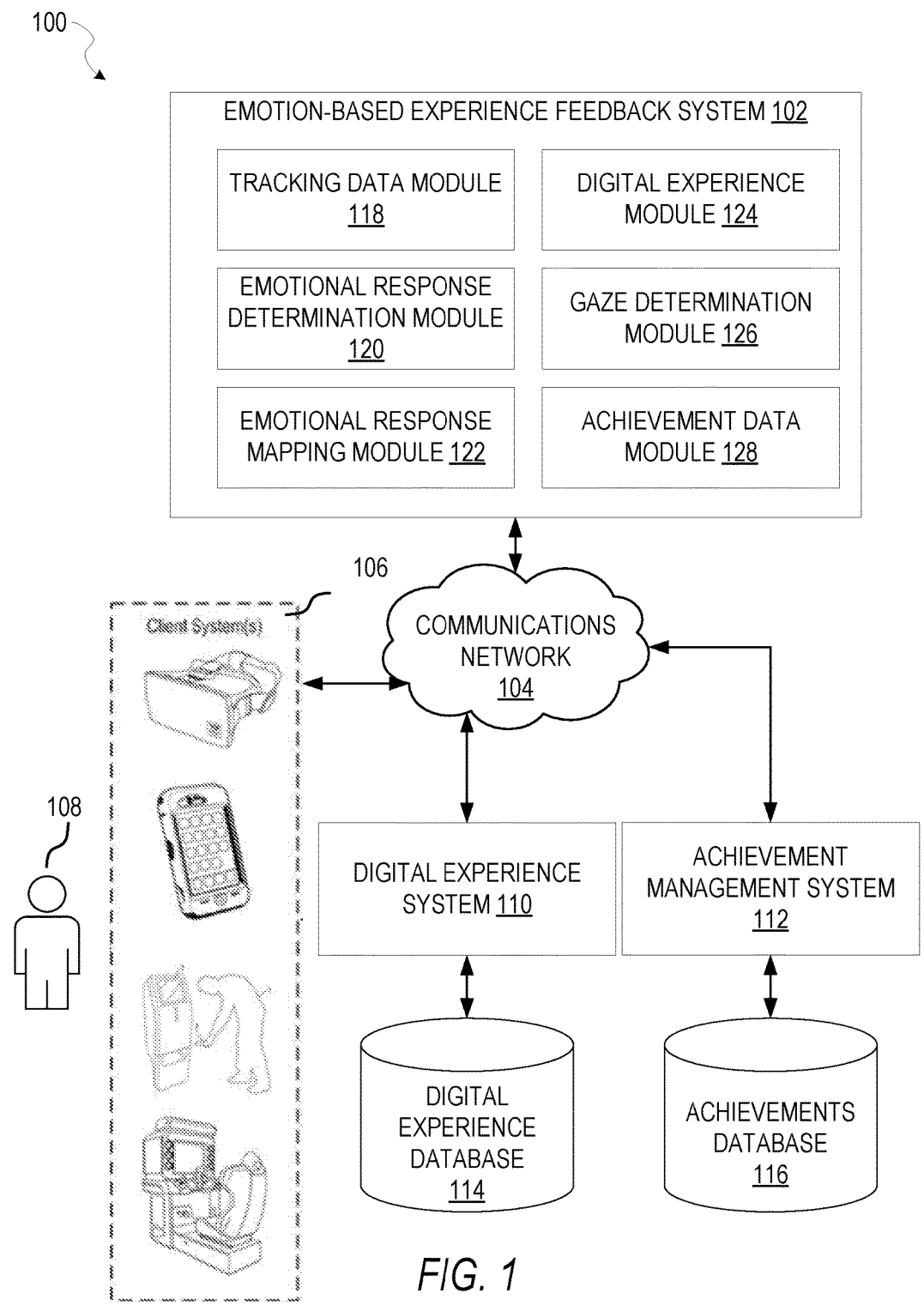
FIG. 1 is a diagram illustrating an example system for providing an experience element of a digital experience based on emotional response of a participant, according to some embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Various embodiments described herein provide for dynamic scoring (e.g., audio, visual, haptic, etc.) of a digital experience, such as a virtual reality experience (VRE), for a participant based on the participant's past or present emotional response to the digital experience. The dynamic scoring of the digital experience can determine (via narrative paths) a narrative orientation of a digital experience that involves a narrative, or can determine experience elements (e.g., cinematic elements) expressed or applied to the digital experience. For some embodiments, the emotional response of a participant is determined based on tracking the head (e.g., movement, distance, direction of change, etc.) of the participant. The tracking data may, in some instances, come from a sensor of a head-mounted display that a participant is utilizing to experience the digital experience. Using various embodiments, a digital experience can attempt to illicit a set of emotional responses from a participant, observe which of the emotional responses is actually provided by the participant, map the observed emotional response to some sort of optional or alternative element of the digital experience, and serve the mapped element to the participant as feedback to the motion response.

According to some embodiments, a software tool is used to map experience elements of a digital experience, such as audio scores, haptic scores, camera positions, access to narrative paths, and the like, to participants based on emotional response of the participant (e.g., with respect to characters and perspectives of the digital experience) determined based on at least one of head tracking, motion tracking, or eye tracking of the participant. At particular points in a digital experience (also referred to herein as, "events"), head movements, eye movements, or other non-verbal cues produced by a participant while experiencing (e.g., viewing) the digital experience may be observed, and these observations can be matched to an emotional response of the participant. The emotional response, in turn, can determine an experience element (e.g., integrated audio-haptic-perspective score) of the digital experience provided (e.g., delivered) to the participant. In this way, various embodiments can provide a participant the opportunity to experience a digital experience (e.g., narrative VRE) in alignment with various characters or perspectives through an interactive digital experience delivery system.

An example system implementing an embodiment may provide previsualization to a digital experience distribution system integrated into narrative digital experiences of one or more simultaneous users. This example system may comprise: a software application program interface (API) integration to detect motion patterns from head-mounted displays; an artificial intelligence-based method for interpreting observed affective responses to stimuli caused by the digital experience; a gaze-based heat map that can aggregate and interpret eye tracking to determine what in the digital experience the participant is looking at; a dynamic method to match individual participants to perspectives of characters or observers in the digital experience; and an API integration with an achievement management system to provide access to participant profiles and participant achievement data (e.g., achievements earned in a digital experience or related digital experiences). Depending on the embodiment, a participant profile or participant's achievement data can enable optional or alternate narrative paths for the participant within the digital experience.

Alternate or optional experience elements of a digital experience can be made available (e.g., delivered) to the participant within a digital experience engaged in by the one or more participants based on real-time participant feedback. Example experience elements of a digital experience can include, without limitation, an audio score, a visual score, a haptic score, a perspective score, or a narrative path (of a narrative digital experience). This feedback may be obtained from the participant by way of tracking data (e.g., relating to head tracking, motion tracking or eye tracking) at various, identified events in the digital experience (e.g., in the narrative structure of the digital experience). An artificial intelligence-based mapping method may assign an experience element of the digital experience (e.g., an audio, haptic, or perspective score) to a participant at a key point or points within the digital experience (e.g., narrative digital experience) based on the participant feedback available to the system. The participant feedback may vary depending on the hardware or platform configuration used by the participant to participate in the digital experience.

In synchronized digital experiences, experience elements of a digital experience (e.g., audio, haptic, or perspective scores) that identify with protagonists, antagonists, or other characters or perspectives within the digital experience, may be provided to a participant (e.g., using the AI-based mapping method) by determining which participant is linked to which experience element of the digital experience. This link between a participant and an experience element of the digital experience may be determined based on the gaze-based heat map of each participant and, additionally, based on a participant's user profile (e.g., from an achievement management system).

As used herein, "digital experience" can include a video game, a virtual environment (e.g., 3D-rendered virtual world), a virtual reality experience (VRE), a digital story, and the like. A digital experience can include an overarching narrative, which a participant may experience within a virtual environment. The digital experience may be interactive or non-interactive, narrative or non-narrative, purchased or earned, an event (e.g., brand-related event) or ongoing, or single-participant or multi-participant. The digital experience may be experienced through a variety of computing devices (e.g., mobile device or VRE equipment such as a virtual reality headset), at home or at a particular destination.

A digital experience includes a set of experience elements. As used herein, an "experience element" of the digital experience can comprise a component of a digital experience that is delivered to, and is sensible by, a participant of the digital experience (e.g., through one of the participant's human sensory organs) as the participant experiences the digital experience. An experience element can include a visual score (e.g., video), an audio score (e.g., musical soundtrack), a haptic score (e.g., relating to vibration, force feedback, temperature, etc.), an experience object (e.g., a narrative path or virtual object), a perspective (e.g., a camera position within a virtual environment), and the like. Additionally, an experience element of a digital experience may be delivered to a participant by way of the set of devices (e.g., VRE equipment, head-mounted display, mobile device, handheld controller or input device, etc.) the participant uses to experience the digital. A given experience element may be an optional or alternative experience element of the digital experience. According to various embodiments described herein, an optional or alternative experience element of a digital experience may be expressed or enabled based on an emotional response from a participant experiencing the digital experience.

As used herein, an "experience object" can include a narrative path (or a narrative branches), a virtual object in the virtual environment, an achievement (e.g., in experience or one related to a companion experience), a virtual environment visual (e.g., background colors or virtual object colors), or a virtual environment sound. For instance, an experience object can include a virtual object, in a virtual environment, which a participant can experience, perceive, or interact with in the virtual world audibly, tangibly, and visibly. The experience object may be one that can have abilities/skills/effects within the virtual world, and can have physical properties within the virtual world (e.g., weight, friction, mass, and destructibility).

As used herein, an "event" can signify a particular point (e.g., in time or virtual location) within a digital experience, at which various embodiments described herein may evaluate a participant's emotional response. An event may correspond to a node of a node map that describes a digital experience. A node within the node map can represent, without limitation, an achievement, branch, or participant choice node disposed at an absolute or relative location within a virtual environment (e.g., 3D rendered environment) of the digital experience. A particular node may be activated by a participant's proximity, or the participant's action, to unlock an achievement, open a branch, or afford a choice to the participant.

As used herein, a "participant" can include a user, player (e.g., game player), or member, who may have an associated profile within a database (e.g., a profile or achievements database) that persists before and after their experience with the digital experience. An authenticated participant can include a participant whose registered identity has been verified through login/password, RFID or other verification method. The authenticated participant may be currently engaged in a digital experience (e.g., a digital narrative experience) such that their actions within the experience can affect, or be affected by, a participant's profile (e.g., from a database), thereby personalizing the digital experience.

As used herein, an achievement can include a challenge, a discovery (e.g., discoverable object), a desired object, a goal, or the like, which may be completed, obtained, or attained by a participant within a digital experience (e.g., video game) or in the real world (e.g., visiting a real-world location). A database (e.g., an achievements database) or another type of data store may be used to save data relating to a set of achievements earned by a particular user/participant. A participant collecting an achievement can include earning or unlocking the achievement. Unlocking a narrative path (or narrative branch) can involve, at least in part, presenting a requisite set of achievements at a pre-defined location and time within a digital experience to make an exclusive narrative path available to the authenticated participant to experience.

Reference will now be made in detail to embodiments of the present disclosure, examples of which are illustrated in the appended drawings. The present disclosure may, however, be embodied in many different forms and should not be construed as being limited to the embodiments set forth herein.

FIG. 1 is a diagram illustrating an example system 100 for providing an experience element of a digital experience based on emotional response of a participant, according to some embodiments. As shown, the system 100 comprises an emotion-based experience feedback system 102, a communications network 104, a set of client systems 106, a digital experience system 110, an achievement management system 112, a digital experience database 114 coupled to the digital experience system 110, and an achievements database 116 coupled to the achievement management system 112. The communications network 104 communicatively couples the emotion-based experience feedback system 102, the set of client systems 106, the digital experience system 110, and the achievement management system 112 together. The emotion-based experience feedback system 102 comprises a tracking data module 118, an emotional response determination module 120, an emotional response mapping module 122, a digital experience module 124, a gaze determination module 126, and an achievement data module 128. An end-user of one of the client systems 106 represents a participant 108 of a digital experience provided in accordance with various embodiments described herein. For various embodiments, the components and arrangement of components may vary from what is illustrated in FIG. 1.

The digital experience system 110 provides a digital experience, which may be retrieved from the digital experience database 114, to the set of client systems 106. With the digital experience, the digital experience system 110 can provide an experience element of the digital experience, such as a narrative branch, a score (e.g., haptic, audio, visual, perspective, etc.), a character option, or an achievement, which is sensible by the participant 108 (e.g., by their human sense of sight, touch, hearing, smell, or taste). Depending on the embodiment, the emotion-based experience feedback system 102 can cause the digital experience system 110 to deliver the digital experience to the participant 108 at one of the client systems 106 (e.g., over the communications network 104), or the emotion-based experience feedback system 102 can relay the digital experience (e.g., from the digital experience system 110) to the participant 108 at one of the client systems 106.

The achievement management system 112 manages an achievement associated with a participant, and may further manage a profile of the participant. According to some embodiments, an achievement of a participant (e.g., authenticated participant) is be accomplished in a digital experience (e.g., video game) and then added to the achievements database 116, which records that the participant has secured that achievement. The achievement management system 112 can provide the emotional response mapping module 122 (of the emotion-based experience feedback system 102) with the participant's achievement data (e.g., level of earned achievement) for a given digital experience (e.g., a digital experience that is subsequent or companion to the digital experience in which the achievement was earned). Such achievement data may be provided to the emotional response mapping module 122 with respect to a given event (e.g., decision point) of the given digital experience. A participant profile can provide participant-specific information, such as demographic, kinetographic, and location data. A participant's profile, achievement data, or both can be used in delivering a tailored digital experience (via the experience elements of a digital experience delivered to the participant) to a participant.

The tracking data module 118 accesses tracking data relating to the participant 108 of a digital experience, such as a virtual reality experience, which includes at least one experience element sensible by the participant 108 (e.g., by their human sense of sight, touch, hearing, smell, or taste). For some embodiments, the tracking data is based on sensor data collected from the participant 108 as the participant 108 experiences the digital experience. The tracking data may relate to aspects of the participant 108's body observed by a set of sensors as the participant 108 experiences (e.g., a visual score, an audio score, a haptic score, or a combination thereof, of) the digital experience. The tracking data may more specifically relate to the participant 108's physical response to stimuli from (e.g., a past or present scene of) the digital experience. The tracking data may relate to any form of non-verbal cues produced by the participant 108. The sensors collecting the data may vary in type (e.g., a camera, accelerometer, gyroscope, thermometer, laser scanner, etc.) and may vary in their location relative to the participant 108. For example, a sensor may be disposed upon one or more devices (e.g., client systems 106) the participant 108 is using to experience the digital experience (e.g., mobile device, generic display device, head-mounted display device, or VRE equipment) or directly on the participant 108 (e.g., attached to their clothing or their body).

According to various embodiments, the tracking data relating to the participant 108 is a means for capturing a set of emotional responses from the participant 108, at particular points (e.g., events) within the digital experience, as the participant 108 experiences the digital experience. For particular embodiments, the tracking data comprises at least one of a set of distance values traveled by the participant's head, or a set of delta values relating to change in direction of movement by the participant's head. As noted herein, such information can be useful by the emotional response determination module 120 in determining the participant's emotional response to a digital experience.

The tracking data module 118 includes an API that facilitates access to the tracking data or access to the sensor data (e.g., direct access of sensor data from a sensor or from a client device collecting the data). An included API may also permit the tracking data module 118 to detect patterns (e.g., motion, direction, object recognition) from sensor data provided by a set of sensors.

Depending on the embodiment, the tracking data may relate to at least one of tracking an eye of the participant 108, tracking the head of the participant 108, or tracking the motion (e.g., of the head or body) of the participant 108 during the digital experience. With respect to the head, the motion or distance tracking of the head may be relative to or from the perspective of, for example, a display device displaying the visual output experience element of the digital experience, an audio device outputting an audio experience element of the digital experience, a virtual reality device (e.g., Oculus® or Playstation® VR headset), a camera (e.g., above the display or attached to a head-mounted device), or a laser scanner (e.g., Valve® Lighthouse).

The emotional response determination module 120 determines an emotional response of the participant 108 based on the tracking data accessed by the tracking data module 118. Additionally, the emotional response determination module 120 may determine a set of emotional responses in association with particular points (events) within the digital experience. According to some embodiments, the emotional response determination module 120 determines an emotional response using artificial intelligence that interprets tracking data relating to the participant 108. An embodiment may use artificial intelligence provided by a cross-platform game engine, such as the Unity developed by Unity Technologies, to interpret the tracking data.

Additionally, for some embodiments, the emotional response determination module 120 determines the emotional response by matching at least a portion of the accessed tracking data to a particular tracking condition set associated with the emotional response. Accordingly, the emotional response determined by the emotional response determination module 120 may be one that is inferred, guessed, or interpreted based on the tracking data. Additionally, a particular tracking condition set may represent the inference, guess, or interpretation of the tracking data to an emotional response. Depending on the embodiment, the particular set of conditions may be defined based on past observations of physical responses (e.g., while experiencing the digital experiences) by participants and a survey of their association of their individual physical responses to a particular emotion. Such observations may be made during, for example, a study conducted on participants experiencing digital experiences.

For some embodiments, the emotional response determination module 120 compares at least a portion of the accessed tracking data against a prioritized list of tracking condition sets, where each tracking condition set is associated with a given emotional response. In the prioritized list of tracking condition sets, the emotional response determination module 120 may then identify the first tracking condition set to match the at least a portion of the accessed tracking data, where the identified first tracking condition set would be the particular tracking condition set. Example tracking conditions for to be matched to tracking data can include, without limitation, conditions relating to how much a participant's head moves in the X, Y, or Z direction, and conditions relating to how many times a participant's head changes movement direction in the X, Y, or Z direction.

The emotional response mapping module 122 maps the emotional response, determined by the emotional response determination module 120, to an experience element of the digital experience. To map the emotional response to the experience element, the emotional response mapping module 122 may access achievement data associated with the participant (e.g., from the achievement management system 112), and map the determined emotional response based on the achievement data. For various embodiments, mapping the determined emotional response to the experience element of the digital experience involves the achievement data module 128 accessing achievement data, associated with the participant, from the achievement management system 112. Based on the accessed achievement, the emotional response mapping module 122 can map the determined emotional response based on the achievement data.

The digital experience module 124 provides the experience element of the digital experience, mapped by the emotional response mapping module 122, to the participant 108. As noted herein, the digital experience system 110 may maintain experience elements of the digital experience (e.g., on the digital experience database 114). Depending on the embodiment, the emotion-based experience feedback system 102 can cause the digital experience system 110 to provide the experience element of the digital experience to the participant 108 at one of the client systems 106, or the emotion-based experience feedback system 102 can relay the digital experience to the participant 108 at one of the client systems 106.

The gaze determination module 126 determines a gaze of the participant 108 with respect to the digital experience, which may be used by the emotional response mapping module 122 when the module 122 maps the emotional response to an experience element of the digital experience. For various embodiments, the gaze determination module 126 uses a gaze-based heat map, which can aggregate and interpret eye-tracked interest clues of a participant. A participant's gaze can indicate what the participant is visually focusing their attention on (e.g., character or virtual object) within the digital experience. With this information, the emotion-based experience feedback system 102 can assist in individualizing delivery of experience elements of the digital experience to the participant based on emotional response. Additionally, where a digital experience is being concurrently experienced by a plurality of participants (e.g., through a common client system 106, such as a large screen display), the emotion-based experience feedback system 102 can determine the gaze of each of the participants (e.g., previous or current gaze) to enable delivery of different (e.g., individualized) experience elements of the digital experience to different participants for a given event of the digital experience. For instance, with respect to a given digital experience being experienced by participants A and B at the same time, if the participant A is determined (by the gaze determination module 126) to be focused on character A (e.g., protagonist) and the participant B (e.g., antagonist) is focused on character B, the emotion-based experience feedback system 102 can cause the participant A to receive an experience element relating to character A (e.g., protagonist's musical score) and the participant B to receive an experience element relating to character B (e.g., an optional narrative path and musical score relating to the antagonist's musical score).

From the achievement management system 112, the achievement data module 128 accesses achievement data associated with the participant 108. As noted herein, achievement data accessed by the achievement data module 128 may be used by the emotional response determination module 120 when determining the emotional response of the participant 108.

Figure 2:
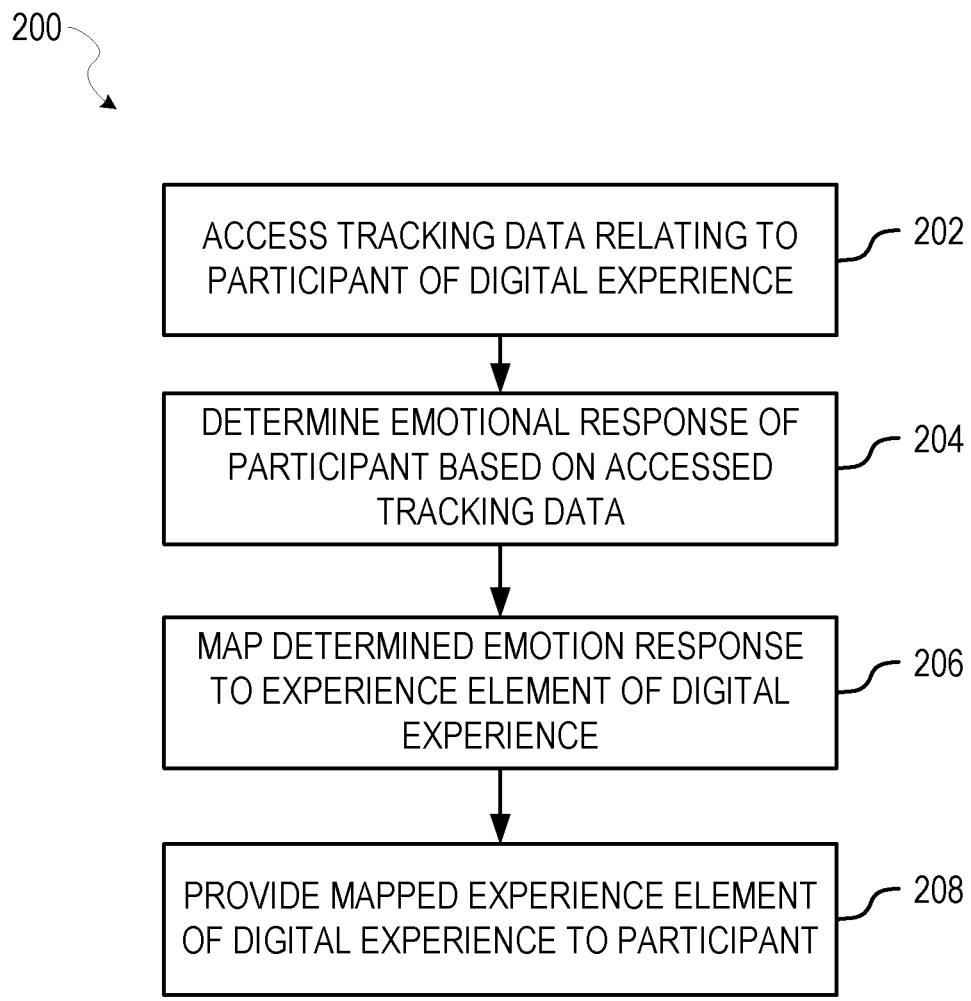
FIGS. 2 and 3 are flowcharts illustrating example methods for providing an experience element of a digital experience based on emotional response of a participant, according to some embodiments.

FIG. 2 is a flowchart illustrating an example method 200 for providing an experience element of a digital experience based on emotional response of a participant, according to some embodiments. For some embodiments, the method 200 is performed, at least in part, by the emotion-based experience feedback system 102 described with respect to FIG. 1. An operation of the method 200 (or another method described herein) may be performed by a hardware processor (e.g., central processing unit or graphics processing unit) of a computing device (e.g., desktop, server, etc.).

The method 200 begins with operation 202 accessing tracking data relating to a participant of a digital experience, where the digital experience includes at least one experience element sensible by the participant (e.g., by their human sense of sight, touch, hearing, smell, or taste). Operation 202 may be performed by the tracking data module 118 of the emotion-based experience feedback system 102 described with respect to FIG. 1. As noted herein, the tracking data may be based on sensor data collected from the participant as the participant experiences the digital experience and, in some instances, the digital experience may comprise a virtual reality experience. According to various embodiments, tracking data (e.g., relating to head tracking, head motions, or eye tracking) for a participant captures an emotional feedback of the participant data at various identified points (e.g., events) during the digital experience.

From operation 202, the method 200 continues with operation 204 determining an emotional response of the participant based on the tracking data accessed at operation 202. In particular, the emotional response determined by operation 204 may be an emotional response associated with a particular set of tracking conditions (e.g., head movement or head movement direction change) that match the participant's tracking data. As noted herein, the emotional response determined at operation 202 may be one that is inferred, guessed, or interpreted based on the tracking data. Additionally, a particular set of tracking conditions may represent the inference, guess, or interpretation of the tracking data to an emotional response. Operation 204 may be performed by the emotional response determination module 120 of the emotion-based experience feedback system 102 described with respect to FIG. 1.

From operation 204, the method 200 continues with operation 206 mapping the emotional response, determined at operation 204, to an experience element of the digital experience. For some embodiments, operation 206 maps the emotional response to the experience element of the digital experience for a given event in the digital experience. Operation 206 may use a lookup table that returns an experience element based on emotional response, and may be further based on an event number of the digital experience. Additionally, operation 206 may be performed by the emotional response mapping module 122 of the emotion-based experience feedback system 102 described with respect to FIG. 1.

From operation 206, the method 200 continues with operation 208 providing the experience element of the digital experience mapped at operation 206 to the participant (e.g., at one of the client systems 106). For some embodiments, operation 208 can cause the experience element of the digital experience to be delivered to a participant at a client system, or can relay the experience element of the digital experience to a participant at a client system. Operation 206 may be performed by the digital experience module 124 of the emotion-based experience feedback system 102 described with respect to FIG. 1.

Figure 3:
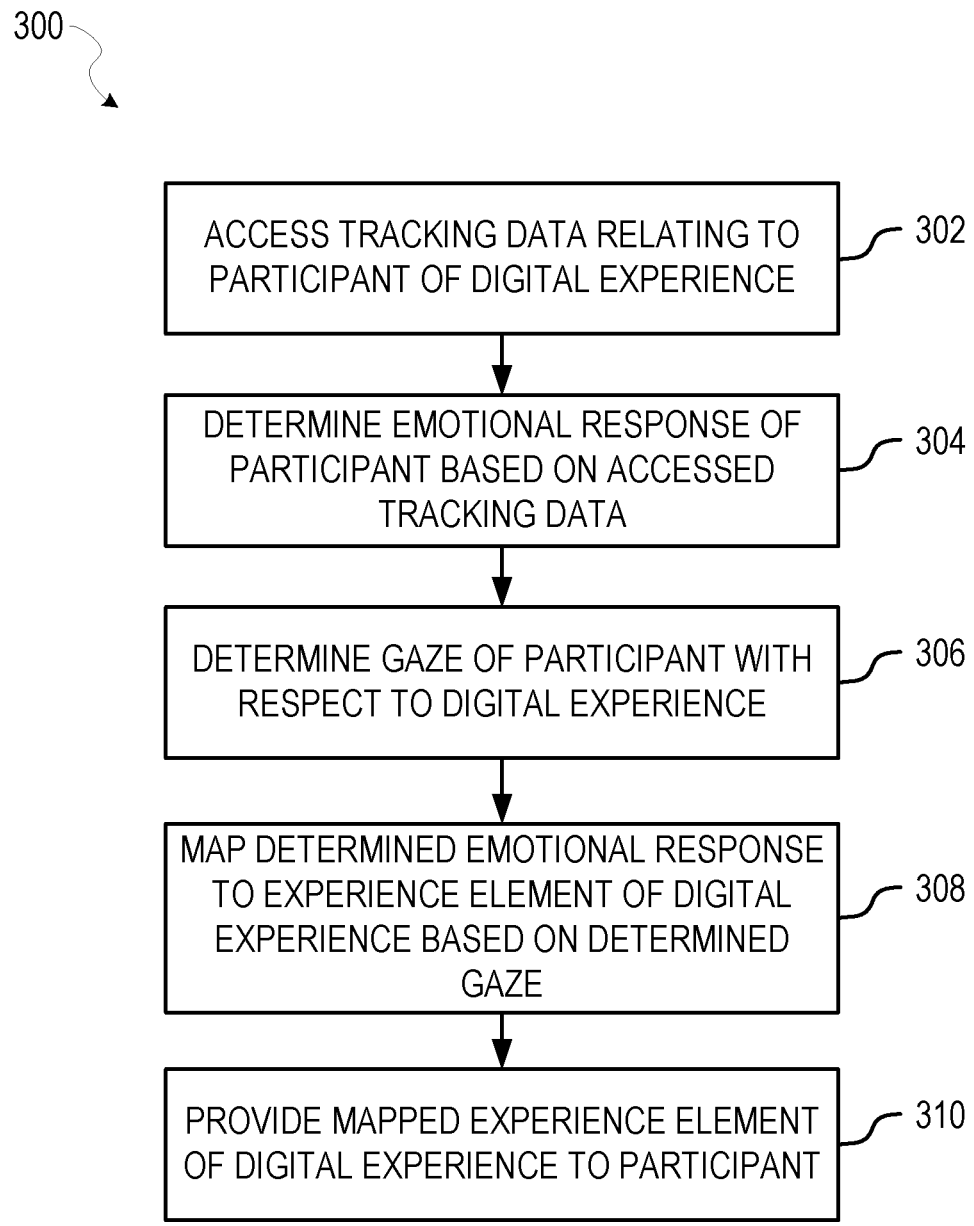

FIG. 3 is a flowchart illustrating an example method 300 for providing an experience element of a digital experience based on emotional response of a participant, according to some embodiments. For some embodiments, the method 300 is performed, at least in part, by the emotion-based experience feedback system 102 described with respect to FIG. 1. As shown, the method 300 differs from the method 200 of FIG. 2 in that method 300 accounts for a participant's gaze when mapping an emotional response.

The method 300 begins with operations 302 and 304, which, according to some embodiments, are respectively similar to operations 202 and 204 of the method 200 described with respect to FIG. 2. From operation 304, the method 300 continues with operation 306 determining a gaze of the participant with respect to the digital experience. Operation 306 may be performed by the gaze determination module 126 of the emotion-based experience feedback system 102 described with respect to FIG. 1. By determining the gaze of a participant with respect to the digital experience at operation 306, the method 300 can determine what area of interest, within the digital experience, the participant is looking at. Additionally, as noted herein, determining the gaze of multiple participants can permit the method 300 to deliver different (e.g., individualized) experience elements of the digital experience to different participants for a given event of the digital experience. Accordingly, from operation 306, the method 300 continues with operation 308 mapping the determined emotional response to the experience element of the digital experience based on the gaze determined at operation 306. From operation 308, the method 300 continues with operation 310, which, according to some embodiments, is similar to operation 208 of the method 200 described with respect to FIG. 2.

Figure 4:
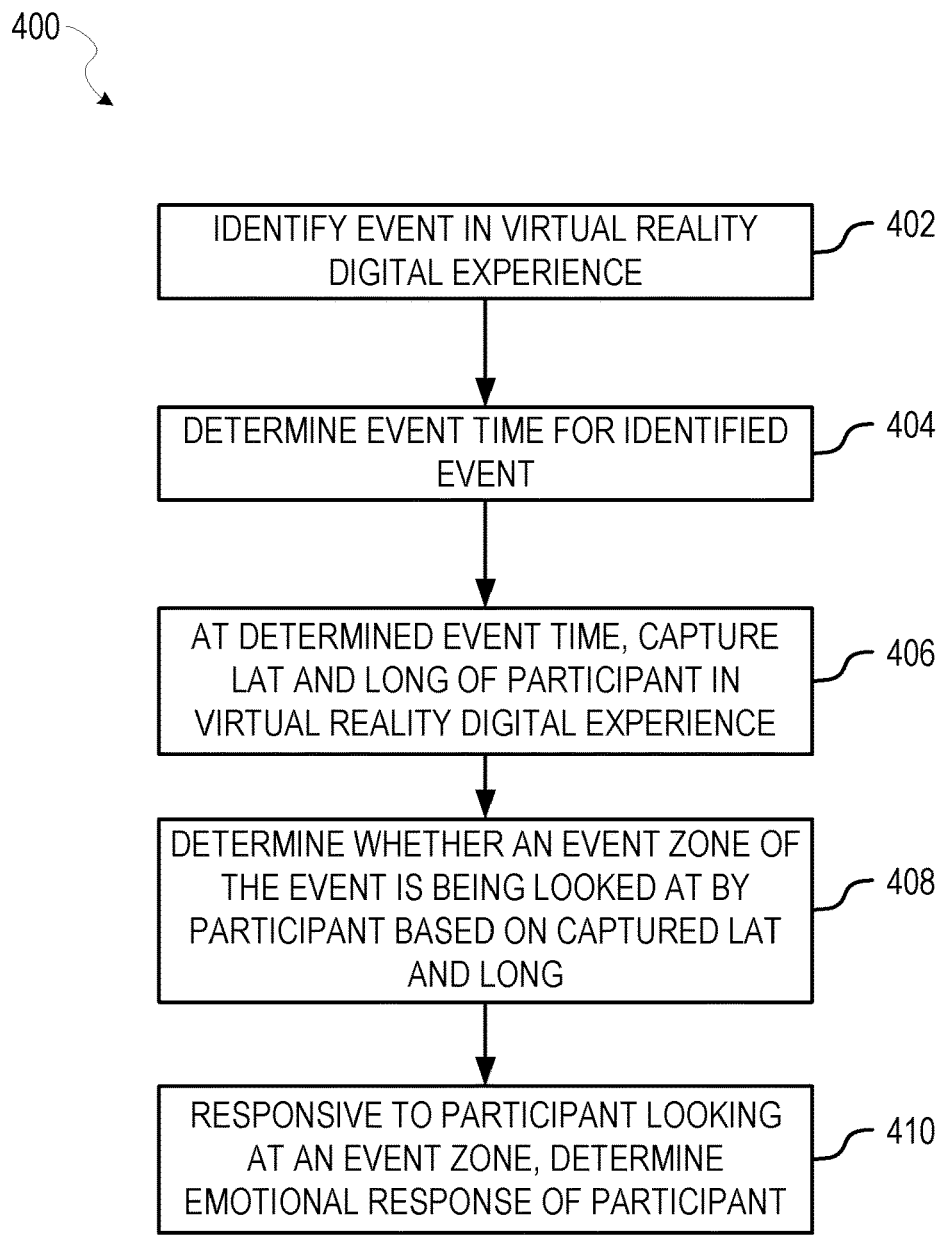
FIG. 4 is a flowchart illustrating an example method for determining a participant's emotional response to a digital experience, according to some embodiments.

FIG. 4 is a flowchart illustrating an example method 400 for determining a participant's emotional response to a digital experience, according to some embodiments. For some embodiments, the method 400 is performed, at least in part, by the emotion-based experience feedback system 102 described with respect to FIG. 1. For example, the emotional response determination module 120 of the emotion-based experience feedback system 102 may perform the method 400 when determining a participant's emotional response as described herein.

The method 400 begins with operation 402 identifying an event in a virtual reality digital experience being experienced by a participant. As noted herein, an event can be a particular point within a digital experience at which an emotional response of a participant may be evaluated based on what the participant is currently looking at within the digital experience.

The method 400 continues with operation 404 determining an event time for the event identified by operation 402. The event time may indicate a time associated with the digital experience (e.g., narrative time) at which the event corresponds.

The method 400 continues with operation 406 capturing, at the event time determined by operation 404, a latitude and longitude of a participant in the virtual reality digital experience. The latitude and longitude of the participant within the virtual reality digital experience can indicate whether the participant is at or in close proximity to the event.

The method 400 continues with operation 408 determining whether an event zone, associated with the event identified at operation 402, is being looked at by the participant based on the latitude and longitude captured at operation 406. For various embodiments, this determination is based on determining the gaze of the participant (e.g., operation 306). For some embodiments, it cannot be assumed that a participant is always viewing an area of interest within a digital experience, especially where the digital experience comprises a virtual reality experience. An event zone can permit various embodiments to determine whether a participant is viewing, within a digital experience, a particular area of interest associated with the event zone. By determining that a particular event zone is being viewed by the participant, various embodiments can interpret what the participant is looking at (e.g., gazing at) and determine the participant's emotional response to the associated area of interest.

The method 400 continues with operation 410 determining an emotional response of the participant in response to operation 408 determining that the participant is looking at the event zone. Based on determining the emotional response of the participant as they look at the event zone, the method 400 can respond to the participant's emotional response with an appropriate experience element of the digital experience that relates to the event zone.

According to some embodiments, the method 400 is implemented in accordance with the following pseudocode:

```
//Define Event_Number//
For each Event_Number from 1 to NumEvents;
    Lookup Event_Time from Events_Database;
    At t=Event_Time(Event_Number), Capture (Start_Latitude, Start_Longitude);
    //Determine what is being watched and determine participant's emotional response to that event; Zones are mutually exclusive//
    For each Zone in EventZones // The Zone you are looking at is determined by Lat and Long
    If
        EventZone MinLat(Event_Number) <= Start_Latitude < MaxLat(Event_Number)
        and
        MinLong(Event_Number) <= Start_Latitude < MaxLong(Event_Number)
    Then // Determine Emotional Response, for example according to the method of FIG. 5//
```

For some embodiments, the method 400 is performed for each event identified in a virtual reality digital experience.

Figure 5:
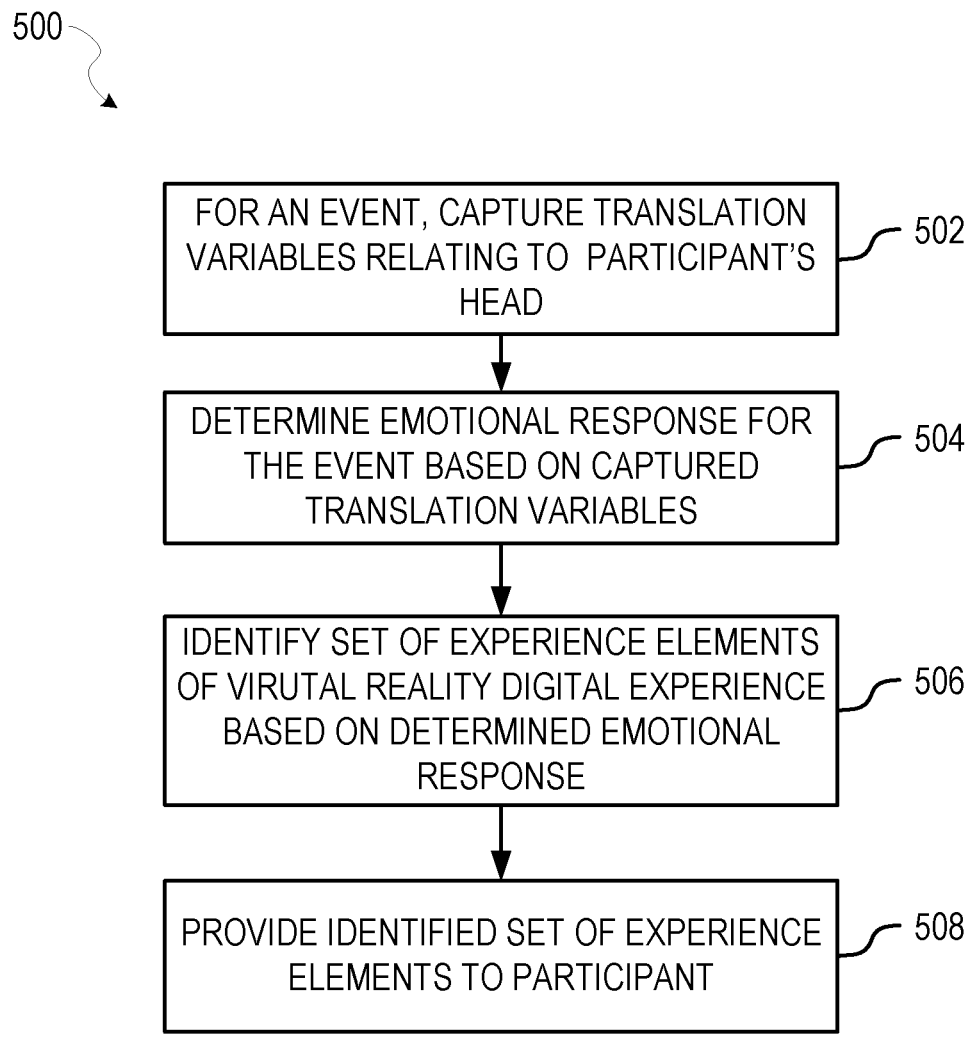
FIG. 5 is a flowchart illustrating an example method for identifying a set of experience elements of a digital experience to provide to a participant based on a participant's emotional response to the digital experience, according to some embodiments.

FIG. 5 is a flowchart illustrating an example method 500 for identifying a set of experience elements, of a digital experience, to provide to a participant based on the participant's emotional response to the digital experience, according to some embodiments. According to some embodiments, the method 500 is performed as part of, or as a result of, operation 410 of the method 400 described with respect to FIG. 4. For some embodiments, the method 500 is performed, at least in part, by the emotion-based experience feedback system 102 described with respect to FIG. 1. For instance, the tracking data module 118, the emotional response determination module 120, and the emotional response mapping module 122 of the emotion-based experience feedback system 102 may perform different operations of the method 500.

The method 500 begins with operation 502 capturing, for a given event, translation variables relating to a participant's head. For some embodiments, capturing translation variables relating to the participant's head comprises obtaining/accessing tracking data of the participant (e.g., via various sensors). For various embodiments, the translation variables represent the physical response of a participant to experiencing an experience element of the digital experience.

According to some embodiments, operation 502 is implemented by a procedure (e.g., Capture TranslationVariables) that captures the following translation variables:

```
//Translation Variables
    Distance_X → total distance traveled in X direction
    Distance_Y → total distance traveled in Y direction
    Distance_Z → total distance traveled in Z direction
    Delta_X → number of times X change in X direction moves from
    positive to negative or negative to positive
    Delta_Y → number of times X change in X direction moves from
    positive to negative or negative to positive
    Delta_Z → number of times X change in X direction moves from
    positive to negative or negative to positive
//
```

The method 500 continues with operation 504 determining an emotional response for the given event based on the translation variables captured at operation 502. Accordingly, the emotional response determined at operation 504 may be one that is inferred, guessed, or interpreted based on the translation variables. In the event that no emotional response is determined by operation 504, operation 504 can select a default emotional response. Additionally, determining the emotional response based on the translation variables can comprise matching at least a portion of the translation variables, captured at operation 502, to a particular set of conditions associated with a given emotional response. The particular set of conditions may represent the inference, guess, or interpretation of the translation variables to determine the emotional response. Depending on the embodiment, the particular set of conditions may be defined based on past observations of physical responses by participants (e.g., while experiencing digital experiences) and a survey of their association of their individual physical response to a particular emotion. Such observations may be made during, for example, a study conducted on participants experiencing digital experiences.

The captured translation variables may be compared against a list of condition sets, where each set is associated with a different emotional response. The list of condition sets may be ordered according to a priority of emotional responses. Depending on the embodiment, the determined emotional response may be the emotional response associated with the first set of conditions, in the list, that matches the captured translation variables. Alternatively, the determined emotional response may be an emotional response associated with the set of conditions, in the list, that best matches (e.g., most closely matches) the captured translation variables.

According to some embodiments, operation 504 is implemented in accordance with the following pseudocode:

```
//Fear → tense, rapid shaking of head back and forth as if shivering//
If MinDeltaX <= Delta_X <= MaxDeltaX and MinX <= Distance_X <=
MaxX Emotion(Event_Number) = Fear
//Anger → sharp movement of head to a forward position as if headbut-
ting
or trying to intimidate//
ElseIf MinDeltaX <= Delta_X <= MaxDeltaX and MinX <= Distance_X
<= MaxX Emotion(Event_Number) = Anger
//Sadness → moderately paced dropping of chin from level to chest as if
dejected//
ElseIf MinDeltaX <= Delta_X <= MaxDeltaX and MinX <= Distance_X
<= MaxX Emotion(Event_Number) = Sadness
//Joy → quick tilting of head in a backward manner is if expressing ela-
tion
or exaltation//
ElseIf MinDeltaX <= Delta_X <= MaxDeltaX and MinX <= Distance_X
<= MaxX Emotion(Event_Number) = Joy
//Agreement → nodding of head; successive movement of level head
from up to down in a rhythmic, equidistant manner//
ElseIf MinDeltaX <= Delta_X <= MaxDeltaX and MinX <= Distance_X
<= MaxX Emotion(Event_Number) = Agreement
//Disagreement → shaking of head; successive movement of level head
from left to right in a rhythmic, equidistant manner//
ElseIf MinDeltaX <= Delta_X <= MaxDeltaX and MinX <= Distance_X
<= MaxX Emotion(Event_Number) = Disagreement
//Anticipation → quick to moderately paced movement of head from
neutral position to forward position as if leaning forward//
ElseIf MinDeltaX <= Delta_X <= MaxDeltaX and MinX <= Distance_X
<= MaxX Emotion(Event_Number) = Anticipation
//Surprise → quick to moderately paced movement of head from
neutral position to backward position as if taken aback//
ElseIf MinDeltaX <= Delta_X <= MaxDeltaX and MinX <= Distance_X
<= MaxX Emotion(Event_Number) = Surprise
Else Emotion(Event_Number) = DefaultEmotion
```

The method 500 continues with operation 506 identifying a set of experience elements of a virtual reality digital experience based on the emotional response determined at operation 504. For some embodiments, the set of experience elements are identified by way of a lookup table, such as one indexed by an event number and the determined emotional response.

According to some embodiments, operation 506 is performed according to the following pseudocode:

```
Based on Emotion(Event_Number)
    Lookup(
    Video_Clip((Video(Event_Number), Emotion(Event_Number)),
    Audio_Clip((Audio(Event_Number), Emotion(Event_Number)),
    Motion_Track((Motion(Event_Number), Emotion(Event_Number)),
    Haptics((Video(Event_Number), Emotion(Event_Number))
    );
PlayInDigitalExperienceEngine(API) Video_Clip, Audio_Clip,
Motion_Track, Haptics;
```

The following illustrates an example lookup table for identifying a video clip for the digital experience. Though not illustrated, the example lookup table can include more (or fewer) columns, each of which is associated with a different possible emotional response.

| Emotion(i) | | | |
|---|---|---|---|
| Event_Number | DefaultEmotion | Fear | Anger |
| 1 | Video_DefaultEmotion_1 | Video_Fear_1 | Video_Anger_1 |
| 2 | Video_DefaultEmotion_2 | Video_Fear_2 | Video_Anger_2 |
| i | Video_DefaultEmotion_i | Video_Fear_i | Video_Anger_i |
| n | Video_DefaultEmotion_n | Video_Fear_n | Video_Anger_n |

The method 500 continues with operation 508 providing the set of experience elements identified at operation 506 to the participant. As noted herein, the method 500 may provide the identified set of experience elements to the participant by causing the experience element of the digital experience to be delivered to a participant at a client system, or by relaying the experience element of the digital experience (e.g., from a digital experience source) to a participant at a client system.

For some embodiments, the method 500 is performed for each event that operation 410 of the method 400 is performed upon.

Figure 6:
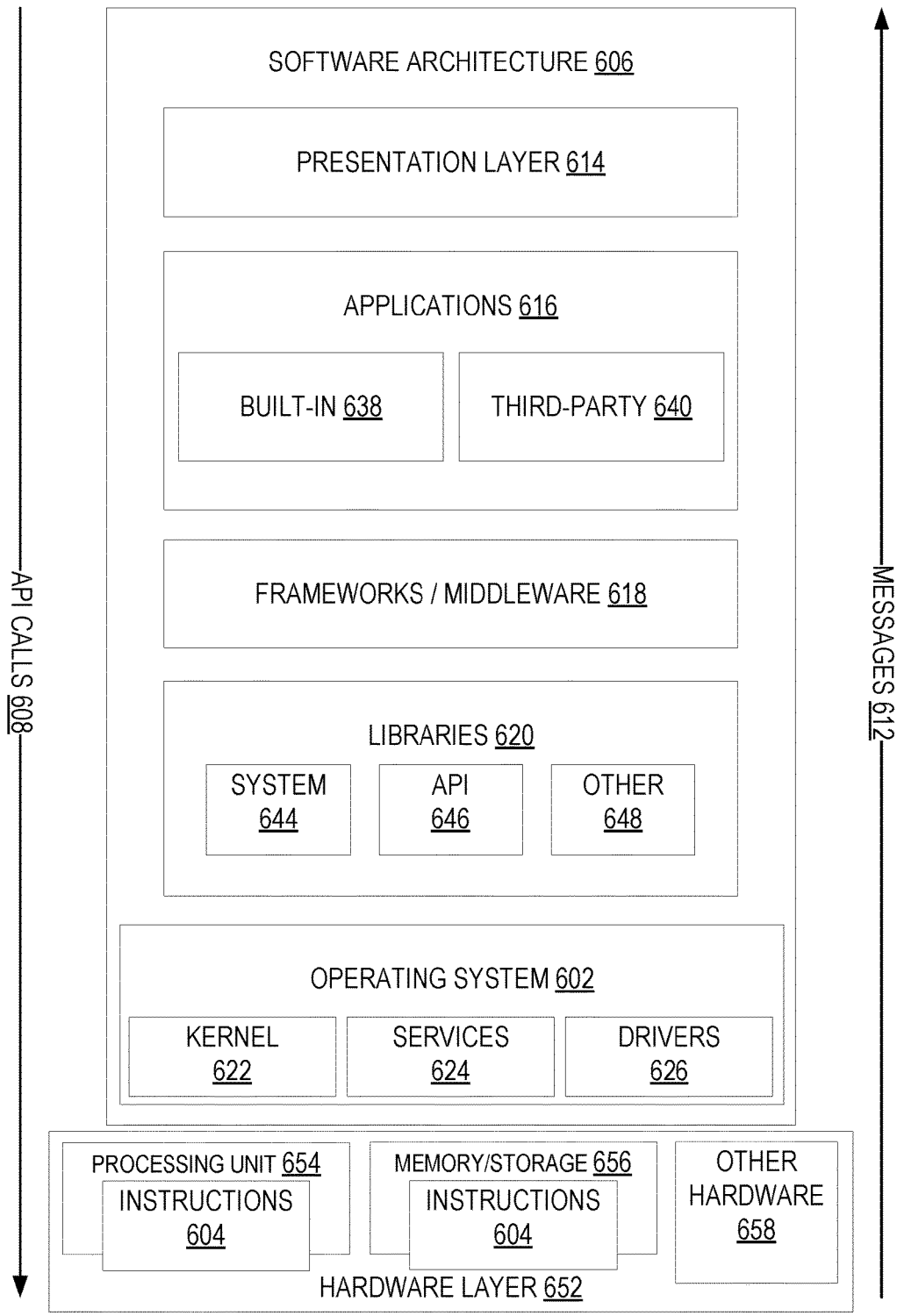
FIG. 6 is a block diagram illustrating a representative software architecture, which may be used in conjunction with various hardware architectures herein described, according to various embodiments of the present disclosure.
Figure 7:
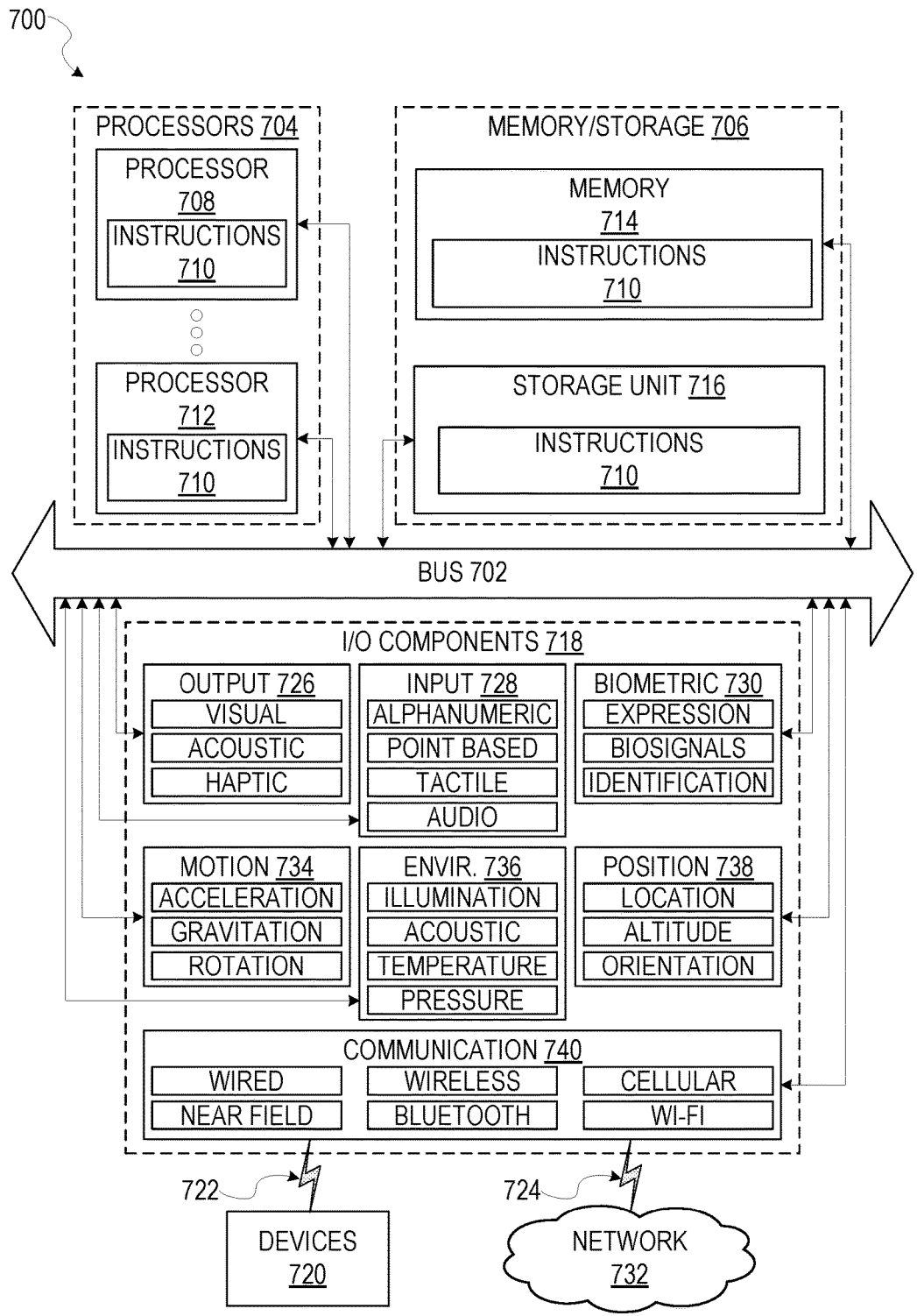
FIG. 7 is a block diagram illustrating components of a machine able to read instructions from a machine storage medium and perform any one or more of the methodologies discussed herein according to various embodiments of the present disclosure.

Various embodiments described herein may be implemented by way of the example software architecture illustrated by and described with respect to FIG. 6 or by way of the example machine illustrated by and described with respect to FIG. 7.

FIG. 6 is a block diagram illustrating an example software architecture 606, which may be used in conjunction with various hardware architectures herein described. FIG. 6 is a non-limiting example of a software architecture and it will be appreciated that many other architectures may be implemented to facilitate the functionality described herein. The software architecture 606 may execute on hardware such as machine 700 of FIG. 7 that includes, among other things, processors 704, memory 714, and I/O components 718. A representative hardware layer 652 is illustrated and can represent, for example, the machine 700 of FIG. 7. The representative hardware layer 652 includes a processing unit 654 having associated executable instructions 604. Executable instructions 604 represent the executable instructions of the software architecture 606, including implementation of the methods, components and so forth described herein. The hardware layer 652 also includes memory and/or memory/storage modules 656, which also have executable instructions 604. The hardware layer 652 may also comprise other hardware 658.

In the example architecture of FIG. 6, the software architecture 606 may be conceptualized as a stack of layers where each layer provides particular functionality. For example, the software architecture 606 may include layers such as an operating system 602, libraries 620, applications 616 and a presentation layer 614. Operationally, the applications 616 and/or other components within the layers may invoke application programming interface (API) calls 608 through the software stack and receive messages 612 in response to the API calls 608. The layers illustrated are representative in nature and not all software architectures have all layers. For example, some mobile or special purpose operating systems 602 may not provide a frameworks/middleware 618, while others may provide such a layer. Other software architectures may include additional or different layers.

The operating system 602 may manage hardware resources and provide common services. The operating system 602 may include, for example, a kernel 622, services 624 and drivers 626. The kernel 622 may act as an abstraction layer between the hardware and the other software layers. For example, the kernel 622 may be responsible for memory management, processor management (e.g., scheduling), component management, networking, security settings, and so on. The services 624 may provide other common services for the other software layers. The drivers 626 are responsible for controlling or interfacing with the underlying hardware. For instance, the drivers 626 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 620 provide a common infrastructure that is used by the applications 616 and/or other components and/or layers. The libraries 620 provide functionality that allows other software components to perform tasks in an easier fashion than to interface directly with the underlying operating system 602 functionality (e.g., kernel 622, services 624 and/or drivers 626). The libraries 620 may include system libraries 644 (e.g., C standard library) that may provide functions such as memory allocation functions, string manipulation functions, mathematical functions, and the like. In addition, the libraries 620 may include API libraries 646 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 620 may also include a wide variety of other libraries 648 to provide many other APIs to the applications 616 and other software components/modules.

The frameworks/middleware 618 (also sometimes referred to as middleware) provide a higher-level common infrastructure that may be used by the applications 616 and/or other software components/modules. For example, the frameworks/middleware 618 may provide various graphic user interface (GUI) functions, high-level resource management, high-level location services, and so forth. The frameworks/middleware 618 may provide a broad spectrum of other APIs that may be used by the applications 616 and/or other software components/modules, some of which may be specific to a particular operating system 602 or platform.

The applications 616 include built-in applications 638 and/or third-party applications 640. Examples of representative built-in applications 638 may include, but are not limited to, a contacts application, a browser application, a book reader application, a location application, a media application, a messaging application, and/or a game application. Third-party applications 640 may include an application developed using the ANDROID™ or IOS™ software development kit (SDK) by an entity other than the vendor of the particular platform, and may be mobile software running on a mobile operating system such as IOS™ ANDROID™, WINDOWS® Phone, or other mobile operating systems. The third-party applications 640 may invoke the API calls 608 provided by the mobile operating system (such as operating system 602) to facilitate functionality described herein.

The applications 616 may use built-in operating system functions (e.g., kernel 622, services 624 and/or drivers 626), libraries 620, and frameworks/middleware 618 to create user interfaces to interact with users of the system. Alternatively, or additionally, in some systems, interactions with a user may occur through a presentation layer, such as presentation layer 614. In these systems, the application/component "logic" can be separated from the aspects of the application/component that interact with a user.

FIG. 7 is a block diagram illustrating components of a machine 700, according to some example embodiments, able to read instructions 710 from a machine storage medium and perform any one or more of the methodologies discussed herein. Specifically, FIG. 7 shows a diagrammatic representation of the machine 700 in the example form of a computer system, within which instructions 710 (e.g., software, a program, an application, an applet, an app, or other executable code) for causing the machine 700 to perform any one or more of the methodologies discussed herein may be executed. As such, the instructions 710 may be used to implement modules or components described herein. The instructions 710 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 700 capable of executing the instructions 710, sequentially or otherwise, that specify actions to be taken by machine 700. Further, while only a single machine 700 is illustrated, the term "machine" shall also be taken to include a collection of machines 700 that individually or jointly execute the instructions 710 to perform any one or more of the methodologies discussed herein.

The machine 700 may include processors 704, memory/storage 706, and I/O components 718, which may be configured to communicate with each other such as via a bus 702. The processors 704 may comprise a single processor or, as shown, comprise multiple processors (e.g., processors 708 to 712). The memory/storage 706 may include a memory 714, such as a main memory, or other memory storage, and a storage unit 716, both accessible to the processors 704 such as via the bus 702. The storage unit 716 and memory 714 store the instructions 710 embodying any one or more of the methodologies or functions described herein. The instructions 710 may also reside, completely or partially, within the memory 714, within the storage unit 716, within at least one of the processors 704 (e.g., within the processor 708's cache memory), or any suitable combination thereof, during execution thereof by the machine 700. Accordingly, the memory 714, the storage unit 716, and the memory of processors 704 are examples of machine storage media.

The I/O components 718 may include a wide variety of components to receive input, provide output, produce output, transmit information, exchange information, capture measurements, and so on. The specific I/O components 718 that are included in a particular machine 700 will depend on the type of machine. For example, portable machines such as mobile phones will likely include a touch input device or other such input mechanisms, while a headless server machine will likely not include such a touch input device. It will be appreciated that the I/O components 718 may include many other components that are not shown in FIG. 7. The I/O components 718 are grouped according to functionality merely for simplifying the following discussion and the grouping is in no way limiting. In various example embodiments, the I/O components 718 may include output components 726 and input components 728. The output components 726 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 728 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 718 may include biometric components 730, motion components 734, environment components 736, or position components 738 among a wide array of other components. For example, the biometric components 730 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 734 may include acceleration sensor components (e.g., accelerometer), gravitation sensor components, rotation sensor components (e.g., gyroscope), and so forth. The environment components 736 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 738 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 718 may include communication components 740 operable to couple the machine 700 to a network 732 or devices 720 via coupling 722 and coupling 724 respectively. For example, the communication components 740 may include a network interface component or other suitable device to interface with the network 732. In further examples, communication components 740 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 720 may be another machine or any of a wide variety of peripheral devices (e.g., a peripheral device coupled via a Universal Serial Bus (USB)).

Moreover, the communication components 740 may detect identifiers or include components operable to detect identifiers. For example, the communication components 740 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 740, such as location via Internet Protocol (IP) geo-location, location via Wi-Fi® signal triangulation, location via detecting a NFC beacon signal that may indicate a particular location, and so forth.

It will be understood that "various components" (e.g., modules) used in this context (e.g., system components) refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function or related functions. Components may constitute either software components (e.g., code embodied on a machine storage medium) or hardware components. A hardware component is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor 708 or a group of processors 704) may be configured by software (e.g., an application 616 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC).

A hardware component may also include programmable logic or circuitry that is temporarily configured by software to perform certain operations. For example, a hardware component may include software executed by a general-purpose processor 708 or other programmable processor 708. Once configured by such software, hardware components become specific machines (or specific components of a machine 700) uniquely tailored to perform the configured functions and are no longer general-purpose processors 704. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 708 configured by software to become a special-purpose processor, the general-purpose processor 708 may be configured as respectively different special-purpose processors (e.g., comprising different hardware components) at different times. Software accordingly configures a particular processor 708 or processors 704, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors 704 that are temporarily configured (e.g., by software) or permanently configured to perform the relevant operations. Whether temporarily or permanently configured, such processors 704 may constitute processor-implemented components that operate to perform one or more operations or functions described herein. As used herein, "processor-implemented component" refers to a hardware component implemented using one or more processors 704. Similarly, the methods described herein may be at least partially processor-implemented, with a particular processor 708 or processors 704 being an example of hardware. For example, at least some of the operations of a method may be performed by one or more processors 704 or processor-implemented components. Moreover, the one or more processors 704 may also operate to support performance of the relevant operations in a "cloud computing" environment or as a "software as a service" (SaaS). For example, at least some of the operations may be performed by a group of computers (as examples of machines 700 including processors 704), with these operations being accessible via a network 732 (e.g., the Internet) and via one or more appropriate interfaces (e.g., an application program interface (API)). The performance of certain of the operations may be distributed among the processors 704, not only residing within a single machine 700, but deployed across a number of machines 700. In some example embodiments, the processors 704 or processor-implemented components may be located in a single geographic location (e.g., within a home environment, an office environment, or a server farm). In other example embodiments, the processors 704 or processor-implemented components may be distributed across a number of geographic locations.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra-books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE STORAGE MEDIUM" in this context refers to a component, device or other tangible media able to store instructions and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EEPROM)) and/or any suitable combination thereof. The term "machine storage medium" should be taken to include a single medium or multiple media (e.g., a centralized or distributed database, or associated caches and servers) able to store instructions. The term "machine storage medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine storage medium" refers to a single storage apparatus or device, as well as "cloud-based" storage systems or storage networks that include multiple storage apparatus or devices. The term "machine storage medium" is non-transitory and, as such, excludes signals per se. A computer storage medium is an example of a machine storage medium. The term "communications medium" in this context includes modulated data signals and other carrier/communication experience elements. The term "machine readable medium" in this context includes both machine storage medium (e.g., computer storage medium) and communication medium.

"PROCESSOR" in this context refers to any circuit (e.g., hardware processor) or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a central processing unit (CPU), a Reduced Instruction Set Computing (RISC) processor, a Complex Instruction Set Computing (CISC) processor, a graphics processing unit (GPU), a digital signal processor (DSP), an application specific integrated circuit (ASIC), a Radio-Frequency Integrated Circuit (RFIC) or any combination thereof. A processor may further be a multi-core processor having two or more independent processors (sometimes referred to as "cores") that may execute instructions contemporaneously.

Throughout this specification, plural instances may implement resources, components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components.

As used herein, the term "or" may be construed in either an inclusive or exclusive sense. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. The specification and drawings are, accordingly, to be regarded in an illustrative rather than a restrictive sense.

It will be understood that changes and modifications may be made to the disclosed embodiments without departing from the scope of the present disclosure. These and other changes or modifications are intended to be included within the scope of the present disclosure.

What is claimed is:

1. A system comprising:
a memory storing instructions; and
a hardware processor communicatively coupled to the memory and configured by the instructions to:
access tracking data relating to a participant of a digital experience, the tracking data being based on sensor data collected for the participant as the participant experiences the digital experience, the tracking data comprising at least one of a set of distance values traveled by a head of the participant or a set of delta values relating to change in direction of movement by the participant's head, the digital experience comprising at least one experience element sensible by the participant;
determine an emotional response of the participant based on the accessed tracking data;
map the determined emotional response to an experience element of the digital experience; and
provide the mapped experience element of the digital experience to the participant.

2. The system of claim 1, wherein the determining emotional response based on the accessed tracking data comprises matching at least a portion of the accessed tracking data to a particular tracking condition set associated with the emotional response.

3. The system of claim 2, wherein the matching the at least portion of the accessed tracking data to the particular tracking condition set associated with the emotional response comprises:
comparing the at least portion of the accessed tracking data against a prioritized list of tracking condition sets, each tracking condition set being associated with a given emotional response; and
identifying the particular tracking condition set as a first tracking condition set, in the prioritized list of tracking condition sets, to match the at least portion of the accessed tracking data.

4. The system of claim 1, wherein the mapping the determined emotional response to the experience element of the digital experience comprises:
accessing achievement data associated with the participant; and
mapping the determined emotional response based on the accessed achievement data.

5. The system of claim 1, wherein the emotional response is determined for a particular point within the digital experience.

6. The system of claim 1, wherein the mapped experience element comprises a narrative path of the digital experience.

7. The system of claim 1, wherein the mapped experience element comprises a perspective score.

8. The system of claim 1, wherein the mapped experience element comprises at least one of an audio score, a haptic score, or a visual score.

9. The system of claim 1, wherein the hardware processor is configured by the instructions to determine a gaze of the participant with respect to the digital experience, wherein the mapping the determined emotional response to the experience element of the digital experience comprises mapping the determined emotional response to the experience element of the digital experience based on the determined gaze.

10. A method comprising:
accessing, by a hardware processor, tracking data relating to a participant of a digital experience, the tracking data being based on sensor data collected for the participant as the participant experiences the digital experience, the tracking data comprising at least one of a set of distance values traveled by a head of the participant or a set of delta values relating to change in direction of movement by the participant's head, the digital experience comprising at least one experience element sensible by the participant;
determining, by the hardware processor, an emotional response of the participant based on the accessed tracking data;
mapping, by the hardware processor, the determined emotional response to an experience element of the digital experience; and
providing, by the hardware processor, the mapped experience element of the digital experience.

11. The method of claim 10, wherein the determining the emotional response based on the accessed tracking data comprises matching, by the hardware processor, at least a portion of the accessed tracking data to a particular tracking condition set associated with the emotional response.

12. The method of claim 11, wherein the matching the at least portion of the accessed tracking data to the particular tracking condition set associated with the emotional response comprises:
comparing, by the hardware processor, the at least portion of the accessed tracking data against a prioritized list of tracking condition sets, each tracking condition set being associated with a given emotional response; and
identifying, by the hardware processor, the particular tracking condition set as a first tracking condition set, in the prioritized list of tracking condition sets, to match the at least portion of the accessed tracking data.

13. The method of claim 10, wherein the mapping the determined emotional response to the experience element of the digital experience comprises:
accessing, by the hardware processor, achievement data associated with the participant; and
mapping, by the hardware processor, the determined emotional response based on the accessed achievement data.

14. The method of claim 10, wherein the emotional response is determined for a particular point within the digital experience.

15. The method of claim 10, wherein the mapped experience element comprises a narrative path of the digital experience.

16. The method of claim 10, wherein the mapped experience element comprises a perspective score.

17. The method of claim 10, wherein the mapped experience element comprises at least one of an audio score, a haptic score, or a visual score.

18. The method of claim 10, comprising determining, by the hardware processor, a gaze of the participant with respect to the digital experience, wherein the mapping the determined emotional response to the experience element of the digital experience comprises mapping the determined emotional response to the experience element of the digital experience based on the determined gaze.

19. A non-transitory computer storage medium comprising instructions that, when executed by a hardware processor of a device, cause the device to perform operations comprising:
- accessing tracking data relating to a participant of a digital experience, the tracking data being based on sensor data collected for the participant as the participant experiences the digital experience, the tracking data comprising at least one of a set of distance values traveled by a head of the participant or a set of delta values relating to change in direction of movement by the participant's head, the digital experience comprising at least one experience element sensible by the participant;
- determining an emotional response of the participant based on the accessed tracking data;
- mapping the determined emotional response to an experience element of the digital experience; and
- providing the mapped experience element of the digital experience to the participant.

* * * * *

UNITED STATES PATENT AND TRADEMARK OFFICE
CERTIFICATE OF CORRECTION

PATENT NO. : 10,152,118 B2
APPLICATION NO. : 15/497643
DATED : December 11, 2018
INVENTOR(S) : Primus et al.

Page 1 of 1

It is certified that error appears in the above-identified patent and that said Letters Patent is hereby corrected as shown below:

On the Title Page

In item (54), in "Title", and in the Specification, in Column 1, Line 2, delete "FREEDBACK" and insert --FEEDBACK-- therefor Signed and Sealed this
First Day of December, 2020

Andrei Iancu
*Director of the United States Patent and Trademark Office*